United States Patent
Tsztoo et al.

(10) Patent No.: US 6,639,915 B1
(45) Date of Patent: Oct. 28, 2003

(54) METHOD AND APPARATUS FOR TRANSMISSION OF VOICE DATA IN A NETWORK STRUCTURE

(75) Inventors: Gary Tsztoo, Saratoga, CA (US); Neal Schneider, Sunnyvale, CA (US); James Washburn, Palo Alto, CA (US); Jayan Ramankutty, San Jose, CA (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/287,302

(22) Filed: Apr. 7, 1999

(51) Int. Cl.[7] .............................................. H04L 12/56
(52) U.S. Cl. .................................... 370/392; 370/395.7
(58) Field of Search ................................. 370/389, 392, 370/395.1, 395.3, 395.7, 412; 709/236; 711/100, 108, 117, 118

(56) References Cited

U.S. PATENT DOCUMENTS

| | | | |
|---|---|---|---|
| 4,156,112 A | | 5/1979 | Moreland |
| 4,534,024 A | | 8/1985 | Maxemchuk et al. |
| 4,771,425 A | | 9/1988 | Baran et al. |
| 5,345,445 A | | 9/1994 | Hiller et al. |
| 5,477,541 A | * | 12/1995 | White et al. ................. 370/392 |
| 5,566,170 A | * | 10/1996 | Bakke et al. ................. 370/392 |
| 5,684,954 A | * | 11/1997 | Kaiserswerth et al. ...... 370/393 |
| 5,793,978 A | | 8/1998 | Fowler |
| 5,867,677 A | * | 2/1999 | Tsukamoto ................. 370/358 |
| 5,898,689 A | * | 4/1999 | Kumar et al. ................ 370/232 |
| 5,949,781 A | * | 9/1999 | Lincoln et al. ............. 370/395.4 |
| 6,208,662 B1 | * | 3/2001 | O'Neill et al. .............. 370/412 |
| 6,215,685 B1 | * | 4/2001 | Fung et al. .................... 365/49 |
| 6,219,763 B1 | * | 4/2001 | Lentz et al. .................. 711/151 |
| 6,243,667 B1 | * | 6/2001 | Kerr et al. .................... 370/379 |
| 6,307,857 B1 | * | 10/2001 | Yokoyama et al. ..... 370/395.72 |
| 6,311,212 B1 | * | 10/2001 | Chong et al. .................. 365/49 |
| 6,343,072 B1 | * | 1/2002 | Bechtolsheim et al. ..... 370/351 |
| 6,389,506 B1 | * | 5/2002 | Ross et al. .................... 711/108 |
| 6,424,659 B2 | * | 7/2002 | Viswanadham et al. .... 370/469 |
| 2001/0030966 A1 | * | 10/2001 | Choi ........................... 370/395 |
| 2001/0038379 A1 | * | 11/2001 | Harrow et al. .............. 345/161 |

OTHER PUBLICATIONS

Chisvin et al. "Content-Addressale and Associative Memory: Alternatives to the Ubiquitous RAM". IEEE Computer. Jul. 1989. pp. 51–64.*

Rosenberg et al., *Internet Engineering Task Force –Internet Draft*, "Issues and Options for RTP Multiplexing", pp. 1–27, Oct. 1, 1998.

* cited by examiner

*Primary Examiner*—Melvin Marcelo
*Assistant Examiner*—Derrick W. Ferris
(74) *Attorney, Agent, or Firm*—Bradley T. Sako; Felix L. Fischer (57) ABSTRACT

According to one embodiment, a system (900) includes a content addressable memory (CAM) address system (910) that receives voice packet data, and in response thereto, generates a channel number value (CHANNEL#). The CHANNEL# value can be used to generate a base address value for a voice packet buffer memory system (912). A base address value will correspond to a particular voice channel. The use of the CAM address system (910) can enable processing of voice data packets "on-the-fly," allowing for rapid processing of voice data transmitted over a network structure and/or result in more efficient use of a buffer memory that stores voice data.

20 Claims, 7 Drawing Sheets

| V | CID | IP PROTOCOL | TCP/UDP DEST. PORT |
|---|---|---|---|
| IP SOURCE ADDRESS ||||

FIG. 11

| PACKET TYPE | MASK TYPE | MASK PATTERN |||||
|---|---|---|---|---|---|---|
| | | V | CID | IP PROT. | DEST. PRT. | IP SRC. ADD. |
| RTP VOICE, RTCP, TCP | 1 | X | | X | X | X |
| RTP MUX VOICE | 2 | X | X | X | X | X |
| ICMP | 3 | X | | X | | X |

| MEMORY BASE ADDRESS | GROUP ID | OTHER |
|---|---|---|

FIG. 14

METHOD AND APPARATUS FOR TRANSMISSION OF VOICE DATA IN A NETWORK STRUCTURE

TECHNICAL FIELD

The present invention relates generally to network structures, and more particularly to an apparatus for transmitting voice data from one network location to one or more other network locations.

BACKGROUND OF THE INVENTION

Network systems typically transmit data from one network location (a source location) to another network location (a destination location) by first placing the data into "packet" form. A packet can include information that allows a data packet to be directed from one network location to another by including certain information, such as a "destination address," that identifies the destination location. Such packet identifying information is typically placed in an initial portion of the packet., often referred to as a "header." The header will, include a number of fields, each of which includes a particular type of packet information. The data carried by the packet is often referred to as a "payload." The process of generating packets from data is often referred to as "packetization." In particularly large networks, packet data can be transferred from a source location to a destination location by way of one or more network nodes. A transmission from one node to the next can be referred to as a "hop."

One particular type of data that is greatly desired but that can be problematic for many network transmission structures, is voice data. Voice data typically involves utilizing an analog-to-digital converter to convert an analog voice signal into digital form. The digital voice data can then be processed further. As just one example, digital voice data can be "compressed" into a more compact form. More compact voice data can be transmitted over a given bandwidth, but at the cost of some fidelity.

One particular way of transmitting voice data is "Voice over Internet Protocol" (often referred to as "VoIP"). Internet Protocol (IP) is one particular protocol for transmitting data over a network structure having devices that recognize the IP protocol. The wide reach of the Internet and wide use of IP in networks makes VoIP a compelling application. VoIP can enable a local network, such as that shared by a corporation, to allow voice communications between the various users in addition to conventional sharing of data and/or applications. Because most connections to the Internet are by way of a conventional telephone line other higher speed connections (IDSN, T-1, or xDSL, as just a few examples) the use of VoIP can provide long distance voice communications at considerable cost savings by avoiding the toll charges required by conventional long distance telephone calls. VoIP can prove extremely valuable to the telecommuter, as data and voice can both be transmitted to an office over the same wire, allowing efficient communication between the remote worker and other on-site workers.

Another advantage of VoIP is the ability to transmit the same data packets to multiple destinations (multicast). This enables teleconferencing to occur over very large distances without the unwanted expense of a conventional long distance telephone, service provider.

The transmission of voice data over the Internet is also referred to as "Internet Telephony." It is expected that Internet Telephony will be a widely used application for the Internet.

The transmission of voice data over network structures can present different concerns from those present in the transmission of other data over network structures. One important concern is that of delay. For example, for many types of data, delay may be acceptable or not relevant. Whether or not text and/or images are not immediately viewable is of less concern than if the text and/or images are corrupted. Accordingly, most protocols are concerned with reassembling data in the proper order; and less concerned with the overall rate at which the data is transmitted. As just one example, a data file can be broken down into packets that are transmitted in a particular order. The packets may be received in a different order, however. Many protocols allow the packets to be subsequently reassembled in the correct order. This is in sharp contrast to voice data. Attempting to have a conversation over a data network can be extremely awkward when undue delay is introduced in the transmission of the voice data. The natural flow of conversation is often interrupted as a delay may be misinterpreted as the end of one person's conversation. Further, if data is lost, or multiple packets take too long to reassemble, speech can be broken up, with portions of the conversation being dropped.

Another concern in voice data over networks is the processing latency introduced by conventional approaches. In particular, the packetization of single channel data can result in inefficient use of network bandwidth, as an entire header must be created, even if the corresponding payload is relatively small.

One approach to voice over data networks is the personal computer (PC) Internet phone or Internet videophone. Such approaches typically involve utilizing the microphone and sound card of a PC in conjunction with associated software. The central processing unit (CPU) of the PC, in conjunction with an analog-to-digital converter (typically in the sound card), converts the voice signal into digital form, and then transmits the data in a conventional fashion as a series of packets.

Figure 1:
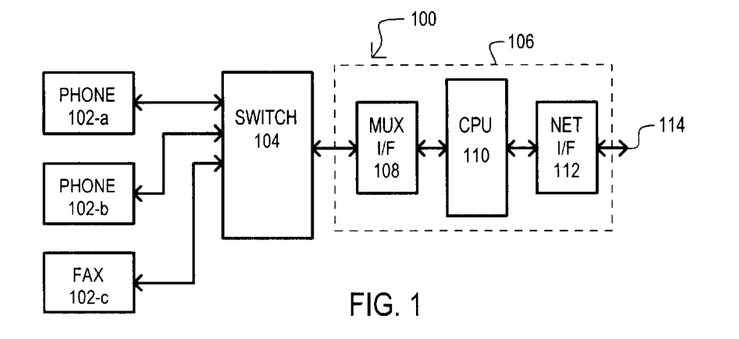
FIG. 1 is a block diagram of a conventional voice data server system.

Another more expensive approach, typically utilized for multiple voice channels, is that of the voice server. A voice data server system is set forth in FIG. 1, and designated by the general reference character 100. A voice data server.system 100 is shown to include a number of different voice data sources. Set forth in FIG. 1 are a number of devices, including conventional telephones 102-a and 102-b, as well as a fax machine 102-c. The voice data server system 100 receives conventional voice data (and other data, such as fax data) from a number of different conventional sources and transmits the voice data over the Internet (or some other network structure) in packet form. Each particular conventional voice source (such as telephones 102-a and 102-b) can be considered a separate voice channel when a conversation is taking place.

As shown in FIG. 1, the devices (102-a to 102-c) are coupled to a switching device 104, such as a private branch exchange ("PBX"). The switching device 104 allows switching between devices (102-a to 102-c), and in addition, allows the devices (102-a to 102-c) to be switched to an internet server 106. The connection to the internet server 106 can be a high-speed multiplexed line, such as a "T-1" carrier line. In such an arrangement, up to 24 voice channels can be carried by the T-1 line to the internet server 106.

The internet server 106 includes a conventional multiplexer interface 108 that de-multiplexes interface 108 that de-multiplexes the conventional voice data. The conventional voice data is then processed by a central processing unit 110, which packetizes data for each channel, and then transmits the packetized voice data to a network interface 112. The packets of voice data can then be output to a network structure, such as the Internet, by way of the network interface 112. The network interface 112 is coupled to a network media line 114.

The voice data server system 100 can also receive voice data packets by way of the network media line 114. Voice packets, each including voice data for a single channel, are stripped of their associated header (de-packetized), and the resulting voice data payload passed on to the multiplexer interface 108. The multiplexer interface 108 then outputs the voice data on the appropriate multiplexed channel. The data is then provided to the desired phone (102-a and 102-b) and/or other device (such as fax machine 102-c) by the switching device 104.

A drawback to many conventional voice-over-network approaches arises out of the intermittent or "asynchronous" nature of voice data from multiple sources (channels). In particular, multiple voice channels will require multiple packetization of voice data. In the event multiple voice channels have data, one channel may be delayed as the others are packetized.

Another drawback to conventional voice over network approaches is the processing required to packetize and de-packetize the data. Data for each voice channel is given a particular header by a CPU. The CPU may have to make multiple memory accesses to translate a voice channel into a header. Conversely, a receiving system CPU must process header information, and forward the attached data to the appropriate channel for the multiplexer interface. Such a processing constraint can be particularly acute when multiple voice channels are transmitted from or received at the same voice server.

Figure 2A:
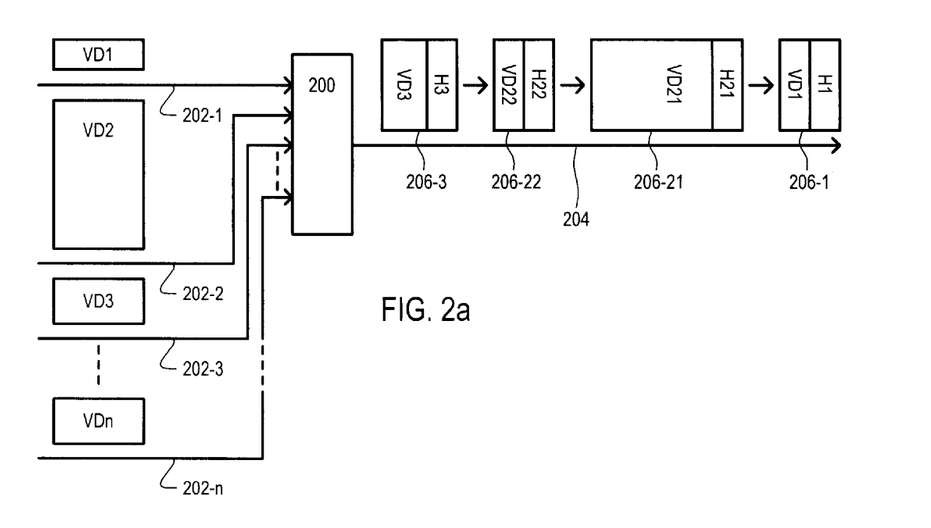
FIGS. 2a and 2b are block diagrams illustrating a conventional voice data server approach.
Figure 2B:
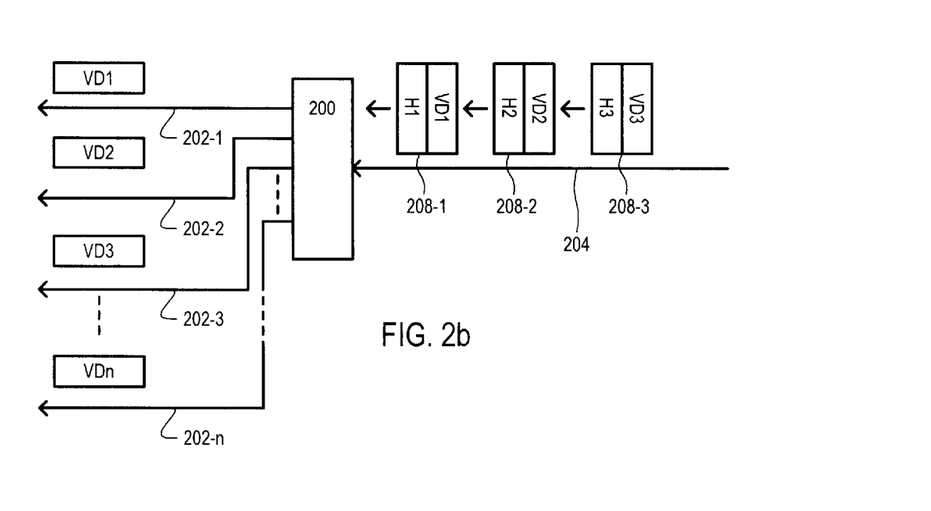

An example of a conventional voice server conversion of voice channel data may be understood with reference to FIGS. 2a and 2b. FIG. 2a sets forth a voice server system 200 that receives, a particular set of out-going voice data from "n" voice channels. The first three voice channels are shown as items 202-1 to 202-3, and the last voice channel is shown as 202-n. Voice channels 202-1 to 202-3 are shown to receive voice data of differing amounts. In particular, voice channel 202-1 receives a relatively small amount of voice data. The data on voice channel 202-1 is shown as VD1 and will fit within the maximum packet length. The data on voice channel 202-2 is shown as VD2, and exceeds the maximum packet length, and so must be packetized into two packets. The data on voice channel 202-3 is shown as VD3, and is greater than that VD1, and less than that of VD2.

The voice server system 200 packetizes the voice data and transmits the packets on a network line 204. The VD1 data is shown to be included in a first packet 206-1. The first packet 206-1 includes a header (H1) and the VD1 data payload. The VD2 data is shown to be included in two packets 206-21 and 206-22. Packet 206-21 includes a header H21 and a first payload of the VD2 data, shown as VD21. Packet 206-22 includes a header H22 and a second payload of the VD2 data, shown as VD22. The VD3 data is included in packet 206-3. Packet 206-3 is shown to include header H3 and the voice data payload VD3.

FIG. 2b sets forth the same system as FIG. 2a, but illustrates the reception of a different set of voice data packets. In the example of FIG. 2b, voice data packets are shown as items 208-1 to 208-3. Unlike the case of FIG. 2a, the payload carried by each packet is of relatively small size. It is noted that each packet includes a header (H1–H3) and corresponding voice data payload (VD1–VD3).

It is clear that the above-mentioned forms of transmitting voice over network wires is highly inefficient. It would therefore be desirable to arrive at some way of transmitting voice data over a network structure that can address the asynchronous (intermittent) nature of voice data. It would also be desirable to arrive at some way of processing voice data that enables more rapid processing where multiple voice channels are involved. It would also be desirable to transmit voice data over a network structure in a more efficient manner.

SUMMARY OF THE INVENTION

According to the disclosed embodiments a system provides for the rapid storage and/or retrieval of voice channel data by utilizing a content addressable memory (CAM) to generate a channel identifying value according to voice data packet identifying information. The channel identifying output value can be utilized to generate address values for a buffer memory having different locations for storing particular voice channel data.

According to one aspect of the disclosed embodiments, a channel identifying output provided by a CAM can be applied to address generating circuits to generate a channel base address for a buffer memory. A buffer memory can include a number of different locations, accessed by channel base addresses, where each different location stores voice data for a particular voice channel.

According to another aspect of the disclosed embodiments, a channel identifying output provided by a CAM can be processed by a processor or the like to generate channel base addresses for a buffer memory.

According to another aspect of the embodiments, the CAM generates storage addresses for multiple voice channels transmitted in a single packet.

According to another aspect of the embodiments, the CAM generates group identification values from the voice channel identifying information. The group identification values can be used to group different voice channels into a single packet for transmission to a network destination.

According to another aspect of the embodiments, incoming voice channel data can be stored in a buffer memory as voice data, and out-going voice data can be stored in the buffer memory as voice data with an associated multiplexed header.

According to another aspect of the embodiments, incoming voice channel data can be received by way of a network input and a conventional time division multiplexed voice line.

According to another aspect of the embodiments, voice channel data can be stored in a buffer memory that can be accessed by the data and address bus of a local processor.

According to another aspect of the disclosed embodiments, voice channel data is stored in a voice packet buffer memory system that includes a static random access memory.

According to the disclosed embodiments, voice channel data is stored in a voice packet buffer memory system that includes an expansion memory interface for accommodating additional memory devices that can store voice channel and other data.

DETAILED DESCRIPTION OF THE EMBODIMENTS

A number of embodiments will now be described in conjunction with a number of block schematic diagrams and illustrative tables. The embodiments set forth a voice processing system that receives voice data from a number of different channels and in a variety of forms, and stores the data at predetermined locations in a buffer memory. The buffer memory can include non-contiguous locations, each location being dedicated to storing voice data for one particular voice channel.

Figure 3:
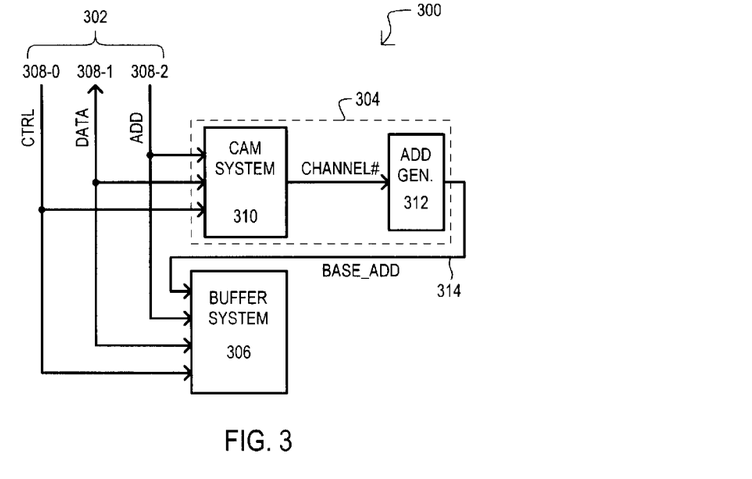
FIG. 3 is block diagram setting forth a first embodiment.

Referring now to FIG. 3, a first embodiment is designated by the general reference character 300, and is shown to include a bus system 302, CAM address system 304, and a buffer system 306. The bus system 302 includes a control bus 308-0, data bus 308-1 and address bus 308-2. In the particular arrangement of FIG. 3, control signals generated on the control bus 308-0 can be-used to apply address and data values to the CAM address system 304 and/or buffer memory system 306.

It is understood that while FIG. 3 sets forth a particular bus arrangement, the arrangement should not be construed as being limited thereto. One possible arrangement could include different buses for the CAM address system 304 and buffer system 306. Another possible arrangement could include a multiplexed address-data bus.

The address and data buses (308-1 and 308-2) can carry voice and related data from a source, such as a network, a personal computer, or a telephone. As just a few examples, voice data can be received in packet form from a network and then various portions of the voice data can be placed on the address and/or data buses (308-1 and 308-2). Voice packet header information can be placed on the address bus 308-2 while voice packet data (e.g., a payload) can be placed on the data bus 308-1. Conversely, voice data stored in the buffer system 306 can be placed on the data bus 308-1, and then subsequently output to a destination. A destination can also be a network, personal computer, or telephone, to name just a few examples. "The address and data buses (308-1 and 308-2) can also function in a more "conventional" fashion, with the an address being applied on the address bus 308-2 to access storage locations within buffer system 306 via the data bus 308-1.

The control bus 308-0 can carry control signals that allow data and address values to be applied to the CAM address system 304 and buffer system 306.

The CAM address system 304 is shown to include a CAM system 310 and an address generator 312. The CAM system 310 can include a CAM having a number of CAM entries, each of which stores a channel number value corresponding to a particular input value or combination of input values. In.this way, information provided on the data bus 308-1, or some combination thereof, can be applied to the CAM system 310 to generate a channel number value (CHANNEL#) that corresponds to the particular input information.

The CHANNEL# value can be received by the address generator 312. The address generator 312 can include hardware dedicated to deriving a base address value (BASE_ADD) for each particular channel number provided by the CAM system 310. The $BASE_{13}$ ADD value can be output on a CAM output bus 314. In this way, the first embodiment 300 can rapidly generate storage address values for voice data on a channel-by-channel basis.

The $BASE_{13}$ ADD value generated by the address generator 312 can be received by the buffer system 306. The $BASE_{13}$ ADD value can be used to access channel-particular storage locations within the buffer system 306. In response to control values on the control bus 308-0, $BASE_{13}$ ADD value can be applied to the buffer system 306. It is noted that while the CAM output bus 314 is shown to be separate from the address bus 308-2, the CAM output bus 314 can be coupled to the address 308-2, or be part of the address bus 308-2. It is also noted that storage locations within the buffer system 306 can also be accessed in a more conventional" fashion by appropriate values the control, address, and data buses (308-0 to 308-2).

Having described the general arrangement of a first embodiment 300, the operation of the first embodiment will now be described.

A voice data packet can be received, and selected information from a voice packet header can be placed on the data bus 308-1. Control signals on the control bus 308 allow the header information to be applied to the CAM system 310. The CAM system 310 outputs a CHANNEL# value that identifies a particular voice channel for the voice data packet. The CHANNEL# is applied to the address generator 312 resulting in a $BASE_{13}$ ADD value being applied to the buffer system 306. At the same time, the payload of the voice data packet is placed on the data bus 308-1. Control signals on the control bus 308-0 allow the $BASE_{13}$ ADD value and payload to be applied to the buffer system 306, allowing the voice data to be stored therein on a channel-by-channel basis. In this way, a CAM system.310 can be employed to rapidly generate voice channel identifying values which can then be used to store voice data at predetermined locations in a buffer memory.

It is noted that the CAM system 310 can be used to generate CHANNEL# values for voice data received in other formats. As just one example, voice data can be received in a time-division multiplexed (TDM) form. A TDM interface circuit can generate a code corresponding to a particular TDM channel. The TDM channel codes can then be placed on the data bus 308-1. Control signals on the control bus 308-0 could allow the code to be applied to the CAM system 310. The CAM system 310 can include entries that store channel numbers corresponding to particular TDM channel codes. Thus, the CAM system 310 can provide CHANNEL# value that identifies a particular TDM voice channel. In this way, the CAM system 310 can be used to generate voice channel values for voice data received in different formats.

Once voice data is stored on a channel-by-channel basis in the buffer system 306, the voice data can-then be read from the buffer system 306. $BASE_{13}$ ADD values corresponding to particular voice channels can be applied via address bus 308-2. Control signals on the control bus 308 will allow the $BASE_{13}$ ADD values to be applied to the buffer system 306, which can then place the stored voice data on the data bus 308-1.

Figure 4:
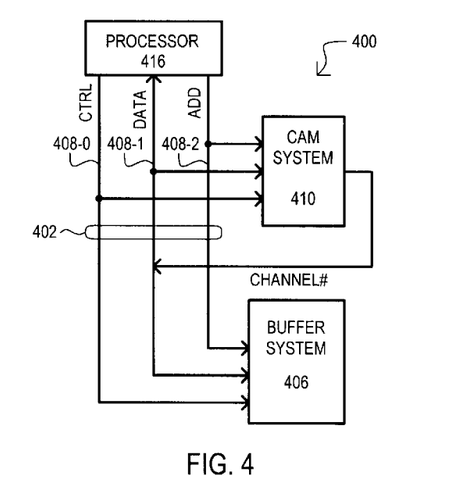
FIG. 4 is a block diagram setting forth a second embodiment.

Referring now to FIG. 4, a second embodiment is set forth, designated by the general reference character 400. The second embodiment 400 can perform some of the same functions as the first embodiment 300. Unlike the first embodiment 300, the second embodiment 400 does not include a dedicated address generator. Instead, base address values for a buffer system can be generated by a processor that receives voice channel identifying information.

The second embodiment 400 is shown to include some of the same general constituents of the first embodiment 300. To that extent, like portions will be referred to by the same reference character, with the first numeral being a "4" instead of a "3." Accordingly, the second embodiment 400 is shown to include a bus system 402 having a control bus 408-0, a data bus 408-1 and an address bus 408-2, a buffer system 406, and CAM system 410. It is understood that bus arrangement of FIG. 4 can be subject to the same variation as that of FIG. 3.

Unlike the arrangement of FIG. 3, the second embodiment 400 also includes a processor 416 coupled to the bus system 402. In addition, the CAM system 410 places a CHANNEL# value onto data bus 408-1. The processor 416 can receive voice data in packet form, and then place header information on the data bus 408-1 and payload data on the data bus 408-1. Further, the processor 416 can read CHANNEL# values placed on the data bus 408-1 and derive corresponding base address values ($BASE_{13}$ ADD) for each particular channel number value. The $BASE_{13}$ ADD value can then be placed on the address bus 408-2. It is understood that the CHANNEL# value could be coupled to the data bus 408-1 by buffer and timing circuits or the like. Further, the CHANNEL# value could be applied to the processor 416 by a separate bus. In this way, the CAM system 410 is provided as a voice channel identifying resource for an accompanying processor 416. Such an arrangement can result in rapid classification of voice channel data.

The $BASE_{13}$ ADD value generated by the processor 416 can be applied to the buffer system 406 by control signals on control bus 408-0. In this way, a processor generated $BASE_{13}$ ADD value can be used to access channel-particular storage locations within the buffer system 406. As in the case of FIG. 3, in the arrangement of FIG. 4 locations within the buffer system 406 can also be accessed in a "conventional" fashion.

Having described the general arrangement of a first embodiment 300, the operation of the second embodiment 400 will now be described.

A voice data packet can be received by the processor 416. The processor 416 can extract selected information from a voice packet header and place the information on the data bus 408-1. Control signals on the control bus 408-0 allow the extracted information to be applied to the CAM system 410. The CAM system 410 outputs a CHANNEL# value that identifies a particular voice channel for the voice data packet. The CHANNEL# can be received by the processor 416, which can derive a $BASE_{13}$ ADD value corresponding to the particular identified channel. The $BASE_{13}$ ADD value can be placed on the address bus 408-2, and at the same time, the payload of the voice data packet can be placed on the data bus 408-7. Control signals on the control bus 408-0 allow the $BASE_{13}$ ADD value and payload data to be applied to the buffer system 406. In this way, a CAM system 410 can be used in the second embodiment 400 to rapidly generate voice channel identifying values which can then be used to store voice data at predetermined locations in a buffer memory.

Once voice data is stored on a channel-by-channel basis in the buffer system 406, the voice data can then be read out from the buffer system 406 in the same general fashion as the first embodiment 300.

Figure 5:
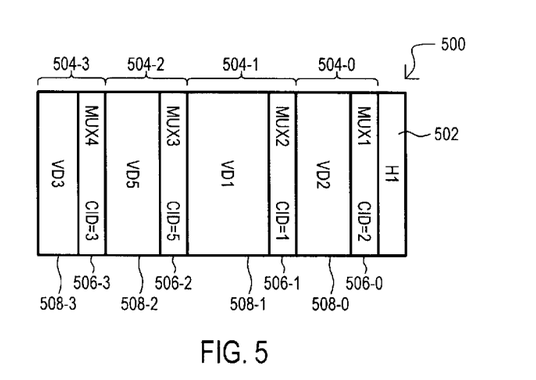
FIG. 5 is a diagram illustrating a packet that includes multiplexed voice channel data.

While the embodiments disclosed herein can be described as processing voice data packets that carry voice data for a single channel, the embodiments can also process voice data packets that include voice data for more than one channel. This may be best understood with reference to FIG. 5. FIG. 5 sets forth a voice data packet that carries voice data for four different channels (channels 1, 2, 3 and 5). That is, while the voice data is being transmitted to the same destination, it includes voice data for different end locations, or possibly different processing parameters. Such voice-data can be referred to as "multiplexed" voice data. The packet is designated by the general reference character 500, and is shown to include a packet header 502 that can include destination information for the packet. This destination information can include, as just one example, the network address for a system that includes one of the embodiments.

The multiplexed voice data includes four sections 504-0 to 504-3. Sections 504-0, 504-1, 504-2 and 504-3 include voice data for a channels "2," "1," "5," and "3," respectively. Each section 504-0 to 504-3 includes an associated multiplexed header 506-0 to 506-3, respectively, and an associated payload 508-0 to 508-3, respectively. The multiplexed headers (506-0 to 506-3) each include channel identifying information (shown in FIG. 5 as CID=2, CID=1, CID=5 and CID=3). The channel identifying information, along with other information within packet header 502, can be applied to a CAM system (such as 310 and 410) to generate a CHANNEL# value. The CHANNEL# value can then be used to generate a base address for each section (504-0 to 504-3). This allows multiplexed payloads (508-0 to 508-3) to be stored within a buffer system (such as 306 and 406) according to their corresponding CHANNEL# value.

In this way, disclosed embodiments can accomplish de-multiplexing of multiplexed network voice data "on-the-fly." Thus, according to the embodiments, rather than store a multiplexed voice data packet and then make multiple memory accesses to essentially "pick out" different channel information, channel identifying information within the same packet can be applied to a CAM system (such as 310 and 410) to generate corresponding CHANNEL# values. CHANNEL# values can then be used to generate base addresses corresponding to different voice channels, for the same packet. The base address values can then be applied in conjunction with corresponding payload data to store voice data for each channel at a different predetermined location within a buffer system (such as 306 and 406).

Figure 6A:
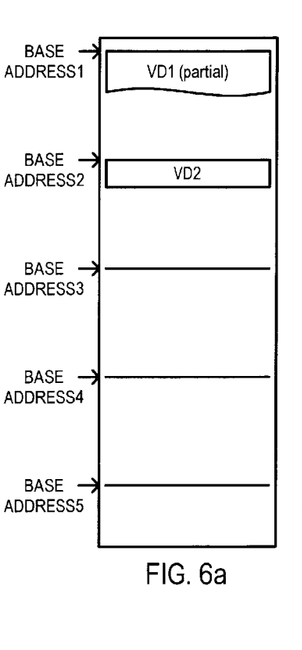
FIGS. 6a–6c are diagrams illustrating the storage of voice channel data into a buffer memory according to the embodiment.
Figure 6B:
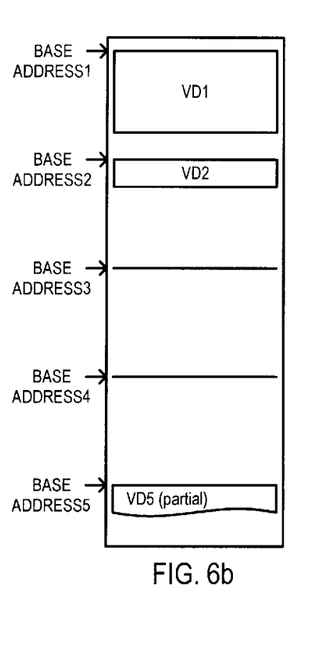
Figure 6C:
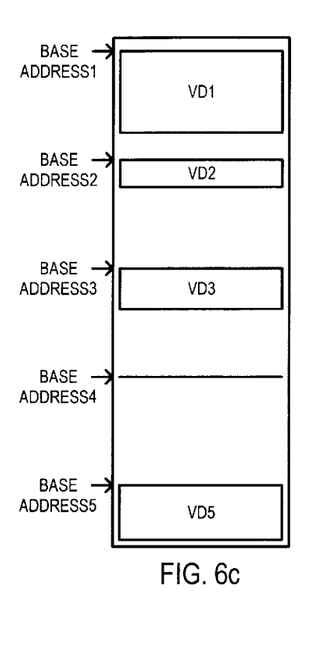

To better understand on-the-fly de-multiplexing, reference is now made to FIGS. 6a to 6c. FIGS. 6a to 6c represent portions of a buffer system (such as 306 and 406) that stores voice channel data, including five voice channels identified as channels 1–5. The figures each set forth the base address for channels 1–5. FIGS. 6a to 6c illustrate the same buffer system following three consecutive time periods. FIG. 6a illustrates the first time period, FIG. 6b illustrates a following second time period, and FIG. 6c illustrates the third time period.

In FIG. 6a, the packet header information and first multiplexed information have been applied to a CAM system (such as 310 or 410), resulting in a base address (BASE ADDRESS2) that corresponds to channel 2. This base address is applied to the buffer system along with the corresponding payload 508-0. In this way, the payload 508-0 is written into the buffer system with reference to the base address BASE ADDRESS 2, by utilizing the fast lookup capabilities of a CAM device.

Once the payload 508-0 is written into the buffer system, the next multiplexed header 506-1 is applied to a CAM system (such as 310 or 410) resulting in a second base address (BASE ADDRESS1) being applied to a buffer system (such as 306 and 406). In conjunction with the second base address, the payload 508-1 is also applied to the buffer system. The first time period ends before the payload 508-1 is completely written into the buffer system.

During the second time period illustrated by FIG. 6b, the writing of payload 508-1 to a location corresponding to BASE ADDRESS1 is completed. In this way, multiplexed voice data for channel 1 is stored to predetermined locations by the operation of a CAM device. Once payload 508-1 is stored, the third multiplexed header 506-2 is applied to a CAM system (such as 310 or 410). A base address (BASE ADDRESS5) for channel 5 is generated, and payload 508-2 begins to be written into the location referenced to BASE ADDRESS5. The second time period concludes before payload 508-2 is completely written into the buffer system.

During the third time period illustrated by FIG. 6b, the writing of payload 508-2 is completed. In this way, multiplexed voice data for a third channel (channel 5) is stored to a predetermined location by operation of a CAM device. The last multiplexed header 506-3 is then applied to a CAM system (such as 310 or 410) resulting in the generation of a base address (BASE ADDRESS3) for channel 3. The payload 508-3 also begins to be written to the location referenced to BASE ADDRESS3. By the end of the third time period, payload 508-3 is completely written into the buffer system.

It is understood that the time periods illustrated by FIGS. 6a to 6c are arbitrary and can be of different lengths. Further, the base addresses do not have to be situated within a buffer system (such as 306 or 406) in any particular order (i.e., lowest channel number to highest channel number). Further still, it is noted that a payload written into a buffer system does not have to start at a given base address. For example, one or more payloads for a given channel may have been previously written into the buffer system. Consequently, the payload may be offset from its corresponding base address when written. Additionally, the particular number of different channels included within a packet (such as that of FIG. 5) can be smaller or larger depending upon the overall allowable packet size. Such constraints can be introduced by the particular protocol used and the systems set forth herein adapted accordingly.

It is also noted that voice data from different channels can be stored in a buffer system (such as 306 or 406), and then read from the buffer system in a group ("binned"). Reading of data can be according to a "binning" algorithm that can advantageously pack data from different voice channels into a common packet, thereby creating multiplexed voice data packets. By establishing predetermined locations for voice data according to a particular channel, a buffer system according to the disclosed embodiments (such as 306 or 406) can advantageously include "templates" for ancillary information that may be transmitted along with the voice data. For example, a conventional packet header could be written into a channel location. Thus, when the voice data is stored, it can be read out with its corresponding header. Similarly, a multiplexed header could be written into the buffer system for the corresponding voice data of a particular channel. The voice data and its multiplexed header could then be read out of the buffer system according to a binning algorithm to form one part of a multiplexed voice packet.

Figure 7:
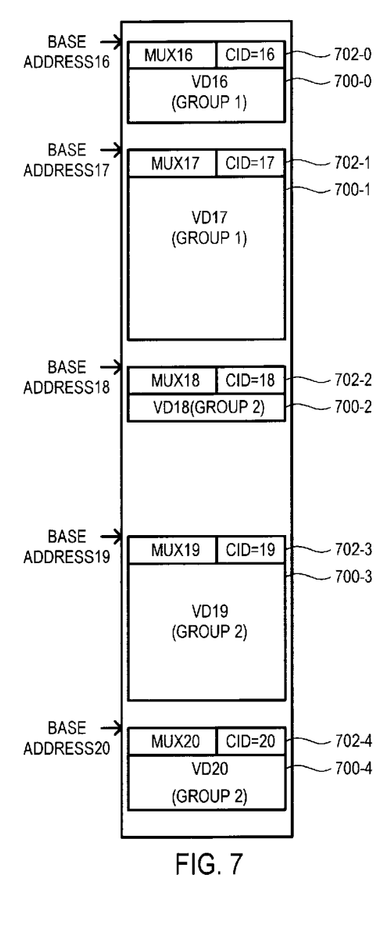
FIG. 7 is a diagram of out-going voice channel data stored within a buffer memory according to one embodiment.

Referring now to FIG. 7, a diagram is set forth illustrating how a contiguous memory space can be divided into non-contiguous portions, according to one embodiment. Each non-contiguous portion can store voice data for a predetermined channel. Such non-contiguous portions can be particularly advantageous for establishing "templates" as described above. For example, a template arrangement could include writing multiplexed header information, such as that set forth as 702-0 to 702-4, into a buffer system prior to the buffer system receiving payload values. Payload values, such as those set forth as 700-0 to 700-4, can then be written into a buffer system in a predetermined relationship to their corresponding multiplexed headers. As just two possible examples, a payload may be written to be contiguous with its multiplexed header, or written to be offset from its multiplexed header.

To better understand the "binning" of voice data, a general example is set forth in FIGS. 7, and 8a–8c. FIG. 7 can illustrates an example of out-going voice data stored in a buffer system (306 and 406). As noted above, the out-going voice data is stored with reference to a base address according to its corresponding voice channel. Five particular voice channels (channels 16–20) are shown in FIG. 7, and it is understood that this is but one limited example. In the particular arrangement of FIG. 7, out-going voice channel data includes not only a payload (700-0 to 700-4, also shown as VD16–VD20) but also a multiplexed header (shown as 702-0 to 702-4). It is understood that a buffer system (such as 306 or 406) could only store a payload, and a multiplexed header could be added to each payload according, to a multiplexer "packetizing" algorithm. Thus, the particular arrangement of FIG. 7 is one of many possible variations.

The various out-going voice packets stored within a buffer system, such as that set forth in FIG. 7, can be accessed by the application of address and control values applied on address and control buses (such as 408-2/308-2 or 408-1/308-2). Such address and control values can be generated according to a "binning" algorithm executed by a processor coupled to the address, and control buses. As noted above, out-going voice data from particular channels can be associated with a particular group. A group may indicate a common destination for the voice channel data, as just one example. The particular grouping for the example of FIG. 7 is shown by the labeling of the particular payloads. In particular, payloads 700-0 and 700-1 belong to "group 1" while payloads 700-2 to 700-4 belong to "group 2."

Groups may be indicated by a "link list" that includes the addresses of voice data for a common group. Such a link list allows for the sequential access of voice channel data for the common group. A binning algorithm can use the link list to gather and transmit voice data for the same group "on-thefly." The link list can be stored in a variety of locations. As just a few examples, a dedicated memory can be provided for the link list. The link list may also be stored in a voice packet buffer memory and/or in a system memory accessed by processors or the like. Alternatively, groups may be indicated by values stored within the voice data or a header accompanying the voice data. Still further, a group may be indicated according to a particular location within a buffer system. As yet another of the many possible implementations, channel numbers can be assigned to particular groups. A binning algorithm can then utilize the group identifying information to commonly output voice data (and any accompanying data, such as a header or multiplexed header) of the same group.

It is understood that the particular order of base addresses set forth in FIG. 7 are intended to present but one example of "out-going" voice channels. Further, it is understood that "incoming" voice channel data (such as that set forth in FIGS. 5a–5c) and out-going voice channel do not have to occupy consecutive base address locations. Further, the number of incoming voice channel locations can be equal to, less than, or greater than the number of out-going voice channel locations. In some embodiments, whether a voice channel location is designated for storing incoming or out-going can be a programmable value. It is also understood that, like the example of FIGS. 6a to 6c, an out-going payload written into a buffer system does not have to start at a given base address, and can be offset therefrom in the event data has been previously written into the voice channel location.

Figure 8A:
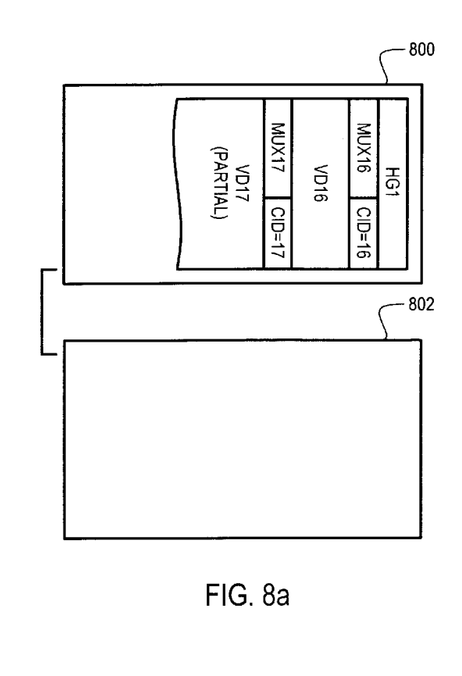
FIGS. 8a–8c are diagrams illustrating the reading of voice channel data from an embodiment according to a binning algorithm.
Figure 8B:
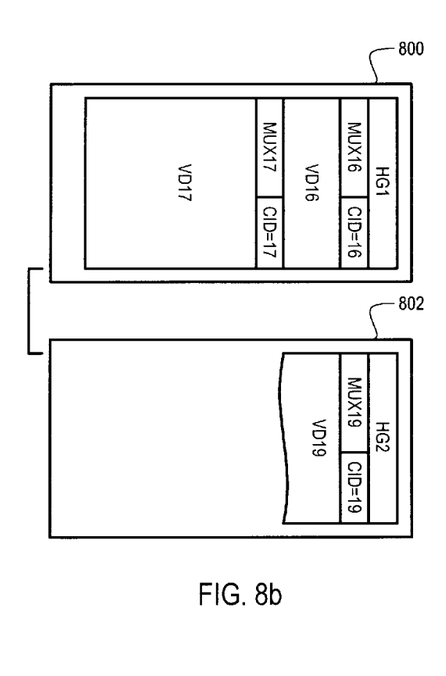
Figure 8C:
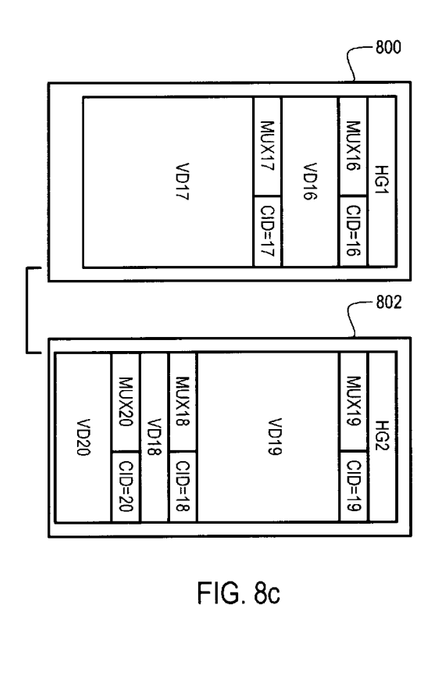

FIGS. 8a–8c illustrate how the voice data can be "binned" according to group identification values. FIGS. 8a to 8c each illustrate two (of many possible) "bins" (800 and 802) that can be compiled from voice data stored in a buffer system.

FIGS. 8a to 8c illustrate sequential time periods that show how the voice channel data of FIG. 7 can be binned. It is assumed that the voice channel data are read in the following order: channel 16, channel 17, channel 19, channel 18, and channel 20. It is further assumed that bin 800 is formed from group 1 values, while bin 802 is formed from group 2 values.

Referring now to FIG. 8a, after a first time period, it is shown that a network header (HG1) can be created for the bin 800 values. The network header can include destination information common to the various voice channels, as just one example. The voice channel data for the channel 16 will be transmitted as part of bin 800, including both the payload (VD16) and multiplexed header (which includes channel ID information CID=16). Further, part of the voice channel data for channel 17 will be transmitted for bin 800. Accordingly, at the end of the first arbitrary time period, bin 800 includes the multiplexed header for channel 17, as well as part of the payload for channel 17. Because no voice channel for group 2 has yet been read, bin 802 is empty (or can store "old" data that can be overwritten).

Referring now to FIG. 8b, after a second time period that follows the first, it is shown that the remainder of the payload for channel 17 has been read for bin 800. In addition, the voice data for channel 19 has started to be read for bin 802. Thus, bin 802 is shown to include its own network header (HG2). The network-header HG2 can include destination information-common to the various voice channels of group 2, as just e example. The multiplexed header and part of the payload for channel 19 are read for bin 802 at the end of the second arbitrary time period.

Referring now to FIG. 8c, at the end of the third arbitrary time period, the data from channels 16–20 have been read.

Accordingly, bin 802 will have included the complete multiplexed headers and payloads for voice channels 19, 18, and 20.

It is understood that the bins (800 and 802) could include payloads only, and network headers (HG1 or HG2) and multiplexed headers could be added according to a packetizing algorithm. In addition, the particular number of voice channels binned together, and maximum amount of binned data can be subject to some variation. As just a few examples, data may be transmitted according to the amount of data to be binned, available bandwidth for transmitting the data, or some combination thereof. Accordingly, the particular transmitting arrangement set forth in FIGS. 8a to 8c is understood to represent but one limited example, and should not be construed as unduly limiting the invention thereto.

In this way, disclosed embodiments of the present invention can utilize a CAM to rapidly group voice data information from multiple voice channels, allowing such groups to be transmitted in a single packet. Such an approach provides for more rapid grouping of voice data and can make more efficient use of available bandwidth.

Figure 9:
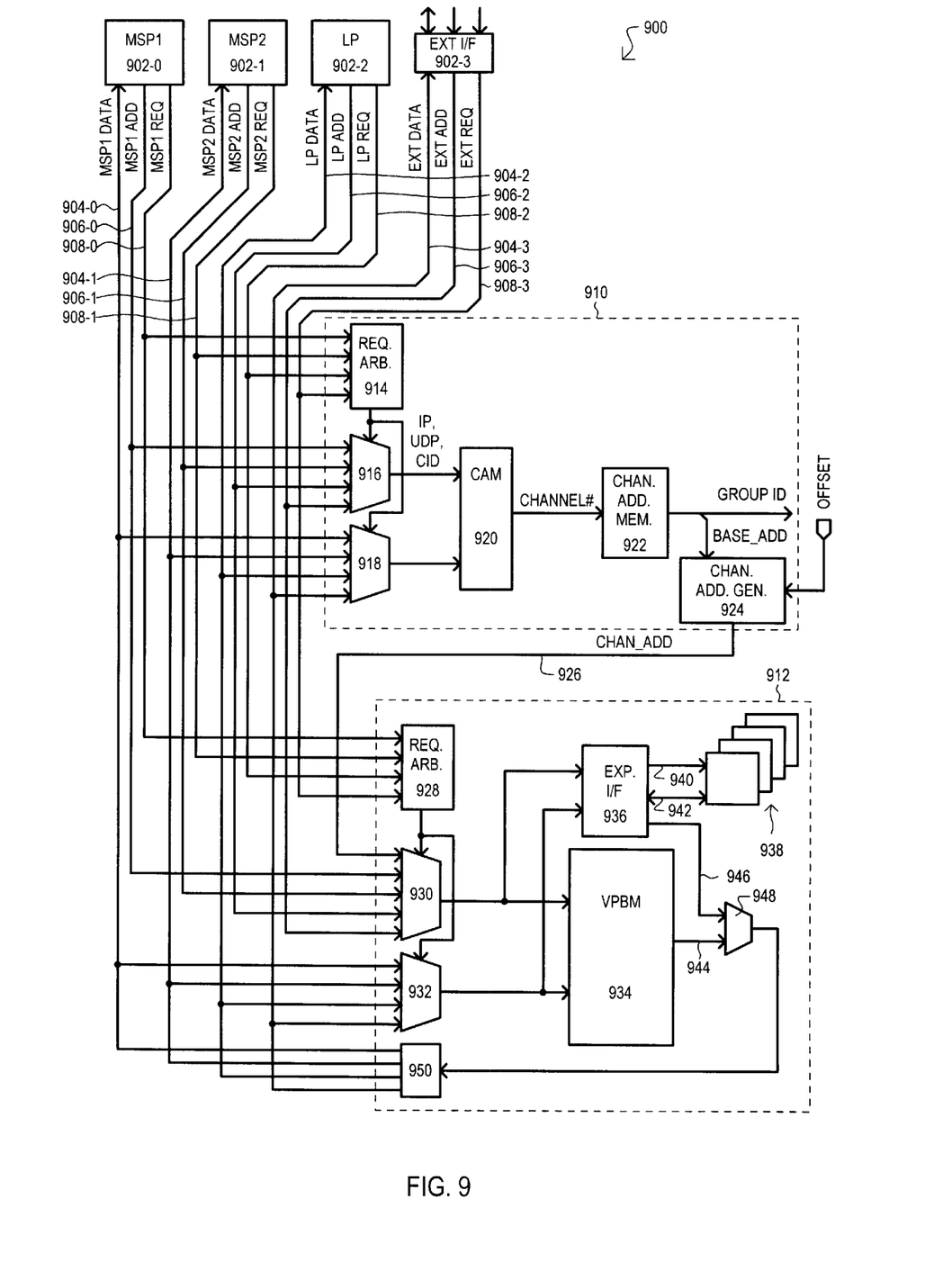
FIG. 9 is a block diagram of a third embodiment.

Referring now to FIG. 9, a third embodiment is set forth in a block schematic diagram. The third embodiment is designated by the general reference character 900, and can be conceptualized as including a variety of devices that can serve as sources and destinations for voice data. The devices include a first multi-layer stream processor (MSP1) 902-0, a second multi-layer stream processor (MSP2) 902-1, a local processor 902-2, and an external bus interface 902-3.

A multi-layer stream processor can be a processor that is capable of receiving voice data from an external source and extracting particular portions of the voice data. As but one example, a multi-layer stream processor can extract different fields from different layers of a packet header. As another example, a multi-layer stream processor can extract a channel from a voice data source that includes TDM voice data. Multi-layer stream processors can include custom designed processors and/or conventional processors optimized for the above mentioned functionality.

Each voice data source/destination (902-0 to 902-3) includes a corresponding data bus (shown as 904-0 to 904-3, respectively), address bus (shown as 906-0 to 906-3, respectively), and request bus (shown as 908-0 to 908-3, respectively). Data buses (904-0 to 904-3) can carry voice data payloads for voice data packets and/or carry header information for voice data packets to a CAM system. Address buses (906-0 to 906-3) can provide access to various memory locations within the system 900. Request buses (908-0 to 908-3) can carry request signals that allow values on the address buses (906-0 to 906-3) and data buses (904-0 to 904-3) to be applied or received by other portions of the system 900.

It is understood that the various buses set forth (904-0 to 904-3, 906-0 to 906-3, and 909-0 to 908-3) can be unidirectional or bi-directional. Further, such buses can be "split." A split bus can include one set of lines coupled to one portion of the system while another set could be coupled to another portion of the system.

The third embodiment 900 can receive voice data information in a variety of formats. In one particular arrangement, the MSP1 902-0 can receive conventional data packets from a network, such as an IEEE 802.3 network (which includes "Ethernet"), to name but one example. MSP1 902-0 can receive conventional network packets, determine the general type of packet, and place packet information on its corresponding address and data buses (904-0 and 906-0) along with request signals. Voice information can also be received by way of time division multiplexer (TDM) data packets. For example, MSP2 902-1 can receive such packets. In the same general fashion as MSP1 902-0, MSP2 902-1 can determine the general type of packet received, and place packet information on its corresponding address and data buses (904-1 and 906-1) along with request signals.

The MSP1 902-0 can process a received packet by examining the header of the packet as it is received. Fields within header data can be used to determine voice packet data from other types of network data. As just one example, one or more fields from a network layer protocol and one or more fields from a lower layer protocol, such as a transport protocol, can be used to identify a particular voice data request. In one particular arrangement, the source address field from a packet having an internet protocol (IP) and the destination port field from the packet having a user datagram protocol (UDP) or transmission control protocol (TCP) can be used to identify a particular source of a voice data request. A channel identification value can also be used to identify a particular voice channel in a multiplexed voice data packet.

The MSP2 902-1 can receive voice packet data in a conventional format, but in TDM form. That is, rather than receive a whole packet of data, packets of data will occupy particular time slots. As just one example, data transmitted over a particular period of time can include data belonging to one packet, while subsequent or preceding periods of time will include data belonging to different packets. In one particular arrangement, packet data can be received on 24 different channels, with each different channel representing a particular packet of data.

The MSP2 902-1 can also receive voice TDM data. Unlike voice packet TDM data, voice TDM data can includes an indication of voice data that occupies particular periods of time. In one particular arrangement, voice data can be received on 24 different channels. The voice data can be received by way of "T-1" line, and therefore be divided into 193-bit frames transmitted 8,000 times per second. Each frame can include 24 channels. The majority of the frames can include an eight-bit sample of voice data for each channel. Every sixth frame can include seven-bit voice data samples for the 24 channels, with the remaining bits providing signal information. Thus, the MSP2 902-1 would receive an indication of one of the 24 particular time slots.

The local processor 902-2 can generate addresses and appropriate request signals on buses 906-2 and 908-2, and thereby write or read voice data on data bus 904-2. In addition, the local processor 908-2 can provide non-voice data, such as control and program data, by way of its buses (904-2, 906-2 and 908-2). Such operations will be described in more detail below.

The external bus interface 902-3 can allow other devices to access the various parts of the third embodiment 900. For example, voice as well as non-voice data can be received and transmitted by way of the external bus interface 902-3. According to one embodiment, the external bus interface 902-3 can be a peripheral component interconnect (PCI) bus interface.

The third embodiment is shown to further include a CAM address system 910 and a voice packet buffer memory (VPBM) system 912. The CAM address system 910 and VPBM system 912 are coupled to the various address, data, and request buses (904-0 to 904-3, 906-0 to 906-3, and 908-0 to 908-3).

The CAM address system 910 is shown to include a request arbiter 914, an address multiplexer (MUX) 916, a data MUX 918, and a CAM 920. The CAM request arbiter 914 can receive request signals from the various request buses (908-0 to 908-3). In response to received request signals, the request arbiter 914 can control the address MUX 916 and the data MUX 918. The address MUX 916 is coupled to the various address buses (906-0 to 906-3). In response to control signals generated by the request arbiter 914, the address MUX 916 provides address information from one of the address buses (906-0 to 906-3) to a CAM device 920. In a similar fashion to the address MUX 916, the data MUX 918 receives the various data buses (906-0 to 906-3) as inputs, and in response to control signals generated by the request arbiter 914, provides data to the CAM device 920.

In this arrangement, in response to various request signals, information on address buses (906-0 to 906-3) and/or data buses (904-0 to 904-3) can be applied to the CAM 920. The request arbiter 914, as its name implies, may also establish priority from among simultaneous request signals received from the request buses (908-0 to 908-3).

The CAM 920 generates a voice channel identification value (CHANNEL#) in response to address and data values receive from buses (904-0 to 904-3 and 906-0 to 906-3). In this way, the CAM 920 can be used to identify a particular voice channel(s) from voice data received by the MSP1 902-0, MSP2 902-1, local processor 902-2, or external bus interface 902-3. As mentioned previously, as just two possible examples, an IP source address, a TCP or UDP destination port can be utilized to identify a particular voice channel in the case of a network voice packet data.

The voice channel identification information is applied as a number of index fields to the CAM 920 to generate a channel identification number (shown as CHANNEL#). As just one example, according to request signals, channel identifying information can be transferred in a serial fashion from the various data buses (904-0 to 904-3) and then arranged in a parallel fashion in the CAM 920. Alternatively, channel identifying information can be transferred in a parallel fashion from the various data buses (904-0 to 904-3) into the CAM It is also noted that values applied to the CAM 920 can be multiplexed. For example, the value applied to the CAM 920 can be applied in a number of incremental values (e.g., a series of word values can be applied). In such a case, the CAM 920 can include a de-multiplexer to combine a series of word values into a larger input value.

Data received by the CAM request arbiter 918 can also be "data multiplexed" (in contrast to time multiplexed). In such an arrangement, a packet can be partitioned into sections, with each section carrying the data of one particular voice channel. In such a case, the CAM 920 can include an additional indexing field for matching a channel identification value.

In this manner, a CAM 920 can be used by the third embodiment 900 to generate a CHANNEL# value for voice data received in a variety of forms, including multiplexed voice packet form. Thus, voice channel identification can be rapidly accomplished allowing corresponding voice data to be rapidly transmitted or rapidly stored.

CHANNEL# values generated by the CAM 920 are applied to a channel address memory 922. The channel address memory 922 includes storage locations corresponding to various CHANNEL# values. Such storage locations can include channel information that can be used by the third embodiment 900 to process voice data. For example, a storage location within the channel address memory 922 can include, among various values, a channel base address values (BASE$_{13}$ ADD) and a group identification values (GROUP ID). The channel address memory 922 can be a random access memory (RAM) that stores base address values corresponding to CHANNEL# values. It can be advantageous to utilize a static RAM (SRAM) as the channel address memory 922 in order to provide relatively high-speed processing of CHANNEL# values.

The BASE$_{13}$ ADD values are applied to a channel address generator 924. The channel address generator 924 can combine a BASE$_{13}$ ADD value with an offset value (OFFSET) to generate a channel address (CHAN$_{13}$ ADD). The CHAN$_{13}$ ADD value is coupled to the VPBM system 912 by a channel address bus 926. The OFFSET value can be used to indicate where voice data should be stored in the event voice data has been previously written to a given channel location.

As noted above, the channel address memory 922 can also provide a GROUP ID value. The GROUP ID value can be used by a "binning" algorithm to organize outgoing voice channel data into groups that can be commonly sent in a single packet.

It is noted that request, address, and data signals can be generated for the CAM address system 910 to provide "non-voice" data that is used to program the operation of the CAM 920. For example, CAM entries can be written and/or overwritten, in order to provide new and/or additional voice channel matching capabilities. Further, depending upon the type of voice data received, proper CAM 920 operation may require different match fields within the CAM 920 to be "masked." Such mask data can also be entered by way of predetermined request, address and data signals. Particular masking schemes for a CAM will be described in more detail below.

Referring once again to FIG. 9, the VPBM system 912 is shown to include a buffer request arbiter 928 coupled to request buses (908-0 to 908-3), an address MUX 930 coupled to the address buses (906-0 to 906-3). The output of the channel address generator 924, is also coupled to address MUX 950. A data MUX 932 is coupled to data buses (904-0 to 904-3). In the same general fashion as the CAM address system 910, the request arbiter 928 controls the address and data MUXes (930 and 932) according to received request values. Thus, according to applied request values, address values on an address bus (906-0 to 906-3) will be applied to the a voice packet buffer memory (VPBM) 934 and a data bus (904-0 to 904-3) will be coupled to the VPBM 934.

In a VPBM write operation, the VPBM 934 can receive voice and/or accompanying data according to a channel number. In a VPBM read operation, the VPBM 938 can provide voice and/or accompanying data according to channel number and/or a group value.

The third embodiment 900 is shown to further include a buffer expansion interface 936. The buffer expansion interface 936 can access values from the address and data buses (904-0 to 904-3 and 906-0 to 906-3). In this arrangement, data and address values can also be applied to.buffer expansion interface 936 in addition to the VPBM 934.

The buffer expansion interface 936 is further coupled to expansion memory devices 938 by an expansion address bus 940 and expansion data bus 942. In this arrangement, the amount of storage available for voice channel data can be increased. This may be particularly useful, as a network employing the teachings of the various embodiments may have an initial voice traffic requirement. This initial capability may need to be expanded, in the future. Alternatively, one system's bandwidth may require a smaller buffer, while another may be capable of transmitting voice data at a much faster rate. The faster system may utilize the buffer expansion interface 938 and corresponding expansion memory devices 938 to process more voice data. It is thus understood that the expansion memory devices 938 are optional in the third embodiment 900.

In a VPBM write operation, a voice data source (902-0 to 902-3) can receive voice packet data, and in response thereto, place voice identifying information on.an address bus (906-0 to 906-3). The voice identifying information, as noted above, can include the voice packet header, or selected fields from within such a header. The CAM address system 910 will process such information to generate a CHANNEL# value. The CHANNEL# value can be applied to the channel address memory 922 and channel address generator 924 to provide a CHAN$_{13}$ ADD value to the address MUX 930.

At the same general time, the voice data (such as the payload) associated with the voice identifying information will be placed on the corresponding data bus (904-0 to 904-3). Request signals will be generated on the corresponding request bus (908-0 to 908-3), resulting in the voice data being written into the VPBM 934. Alternatively, the voice data may be written into the expansion memory devices 938 (if present) by way of the bus expansion interface 936.

In the third embodiment 900, voice data stored in the VPBM 934 (or expansion memory devices 938) can be accessed by a VPBM read operation. In a VPBM read operation, a voice data source (902-0 to 902-3) can receive a channel read request. Such a request indicates that voice channel data for a given voice channel number is to be output from the VPBM system 912. A read request for a given voice channel can be accomplished by generating an address (or sequence of addresses) that begin with the channel memory base address for the desired voice channel. In this way, a channel memory base address will be placed on an address bus (906-0 to 906-3).

At the same time, appropriate request signals will be placed on a corresponding request bus (908-0 to 908-3) allowing the channel memory base address to be applied to the VPBM 934 or buffer expansion interface 936. In response to the applied channel memory base address(es), voice channel data will be output from the VPBM 934 on a VPBM output 944. Alternatively, the application of the channel memory base address to the bus expansion interface 936 can result in a memory address being applied to the expansion memory devices 938.1 The expansion memory devices 938 will output voice channel data to the buffer expansion interface 936. The voice channel data will then be placed on an interface output 946.

Data on the VPBM output 944 or interface output 946 will be output by an output MUX 948. Output data from the output buffer 948 can be coupled to one or more of the data buses (904-0 to 904-3) by VPBM output buffer 950.

The VPBM 934 and expansion memory devices 938 can be a random access memories (RAM). As just one example, the VPBM 934 can be a 32 K×32 static RAM (SRAM). Utilizing a SRAM for the VPBM 934 provides for rapid accesses to the memory device, by avoiding refresh or other time consuming operations required by other memory types, such as dynamic RAMs (DRAMs). The buffer expansion interface 936 can be a conventional SRAM interface, designed to accommodate standard fast SRAM devices. As just one example, the expansion memory devices 938 could include four 64 K×32 SRAMs or four 128 K×32 SRAMs. It is noted that the use of the buffer expansion interface 936 can result in memory accesses to the expansion memory devices 938 introducing an additional cycle of delay (over a VPBM composed of like SRAMs).

It is noted that the third embodiment 900 can advantageously store voice data in the VPBM 934 in groups according to various channel identifying information. Voice channel data for a common destination location can then be commonly situated into a single outgoing packet. Such an arrangement can allow for more efficient and/or more rapid processing of voice data.

A voice packet buffer memory system 912, by segregating selected voice channel data from a "main" system memory, can provide a more rapid and/or less complex memory management approaches than a conventional system that only includes a CPU and a main system memory.

Figure 10:
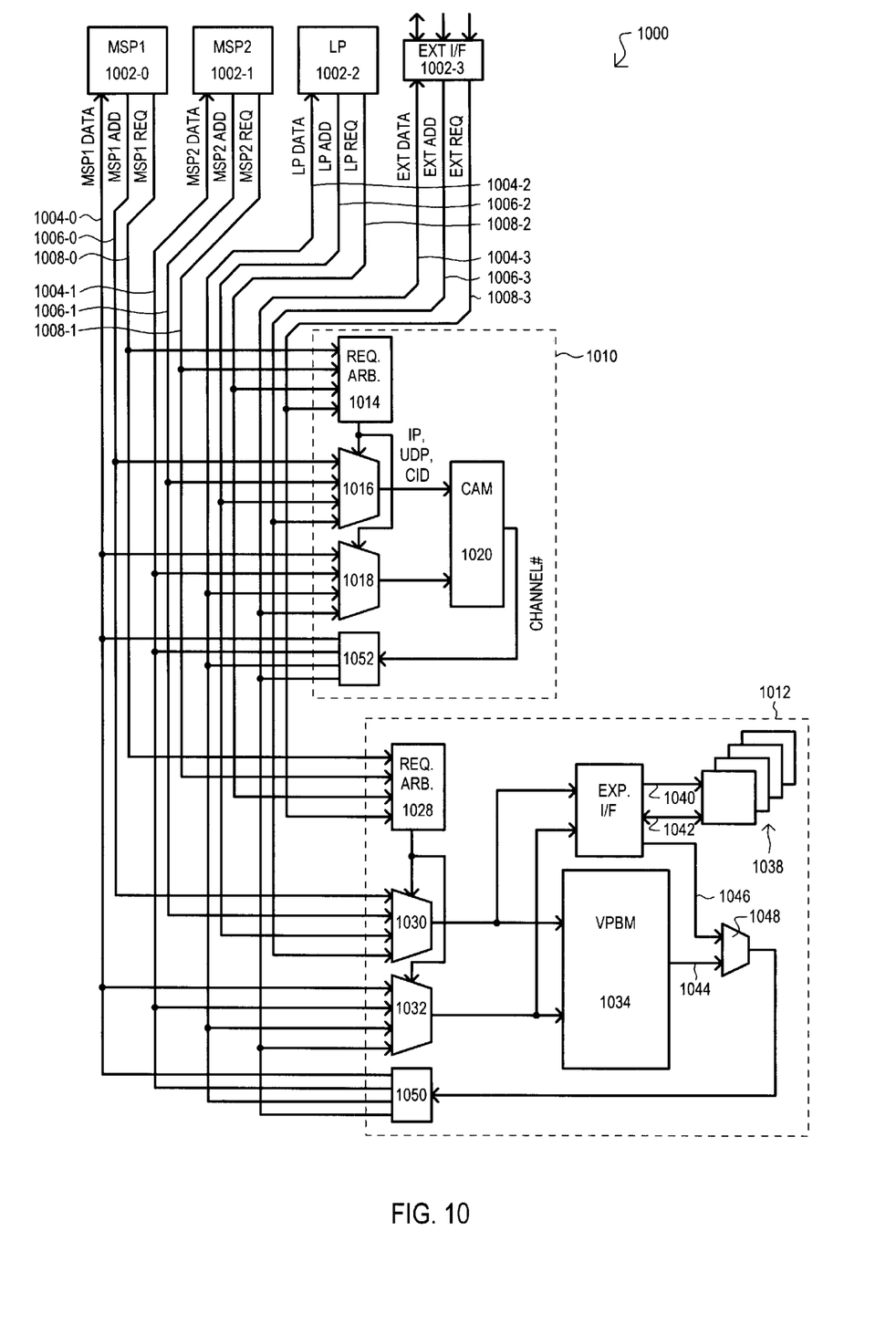
FIG. 10 is a block diagram of a fourth embodiment.

Referring now to FIG. 10 a fourth embodiment is set forth, designated by the general reference character 1000. The fourth embodiment 1000 includes some of the same general portions as the third embodiment 900. To that extent, like portions are referred to by the same reference character, but with the first numeral "9" being replaced with a "10."

One way in which the fourth embodiment 1000 differs from the third embodiment 900, is the arrangement of the CAM address system 1010. The CAM address system 1010 generates a CHANNEL# value, but rather than apply the CHANNEL# value to dedicated hardware (such as a channel address memory 922 and channel address generator 924), the CHANNEL# value can be coupled to a data bus (1004-0 to 1004-3).

Accordingly, in the arrangement of FIG. 10, a processor, or the like, can receive voice channel identifying information from network and other sources, and using a CAM 920, generate CHANNEL# values that indicate a particular voice data source. The CHANNEL# values can then received by a processor (such as the MSP1 902-0, MSP2 902-1, or local processor 902-2), which can then generate a channel memory base address. The resulting channel memory base address will be placed on an address bus (906-0 to 906-3) to access a dedicated location storage location within the VPBM system 1012.

Figure 11:
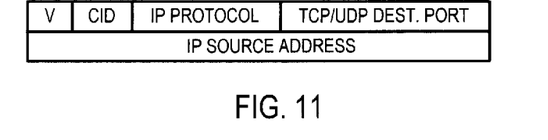
FIG. 11 is a diagram illustrating CAM indexing fields according to one embodiment.

Referring now to FIG. 11, a CAM format is set forth to better understand the operation of the various embodiments. The CAM format illustrates how a lookup operation can be performed by a CAM to generate a CHANNEL# value. The entry of FIG. 11 is shown to include the various network header fields previously described. A channel identification field (CID) can help generate an appropriate CHANNEL™ values from multiplexed headers in a multiplexed voice data packet. An IP protocol field is shown as "IP PROTOCOL." A TCP or UDP destination port value can be stored in a "TCP/UDP DEST. PORT" field. IP source address values can be stored in an "IP SOURCE ADDRESS" field. The "V" value of FIG. 11 can be used by the CAM to indicate when a particular CAM entry is valid or not. Matching operations will not be performed on invalid entries.

In one particular example, a CAM can include 2,048 64-bit entries. The V field can store a 1-bit value, the CID field can store a 7-bit value, the IP PROTOCOL field can store an 8-bit value, and TCP/UDP DEST. PORT field can store a 16-bit value, and the IP SOURCE ADDRESS field can store a 32-bit value.

The CAM matching function provided by a CAM address system of the various embodiments can include different match criteria according to packet type. Accordingly, certain fields set forth in FIG. 11 can be essentially "ignored" depending upon the type of packet being examined. Such an "ignore" operation can be accomplished in a number of ways. As just one example, a CAM (such as 310, 410, 920 and 1020) can include maskable fields the can be programmed into the CAM.

Figure 12:
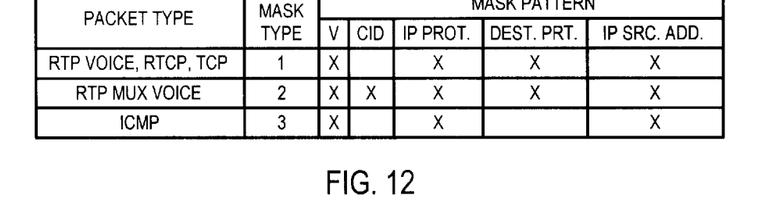
FIG. 12 is a chart indicating the masking of particular CAM index fields according to particular packet types.

One example of a matching function for a CAM is set forth in FIG. 12. As shown in FIG. 12, according to a particular packet type, certain CAM fields are matched while others are ignored. CAM fields that are matched are indicated with an "X", while CAM fields that are blank indicate fields that are ignored. FIG. 12 includes masking for five protocol types, including Real-Time Transport Protocol (RTP), RTP Control Protocol (RTCP), TCP, RTP Multiplexed Voice, and Internet Control Message Protocol (ICMP). In this way, a CAM can provide matching results for a number of different packet types.

Figure 13:
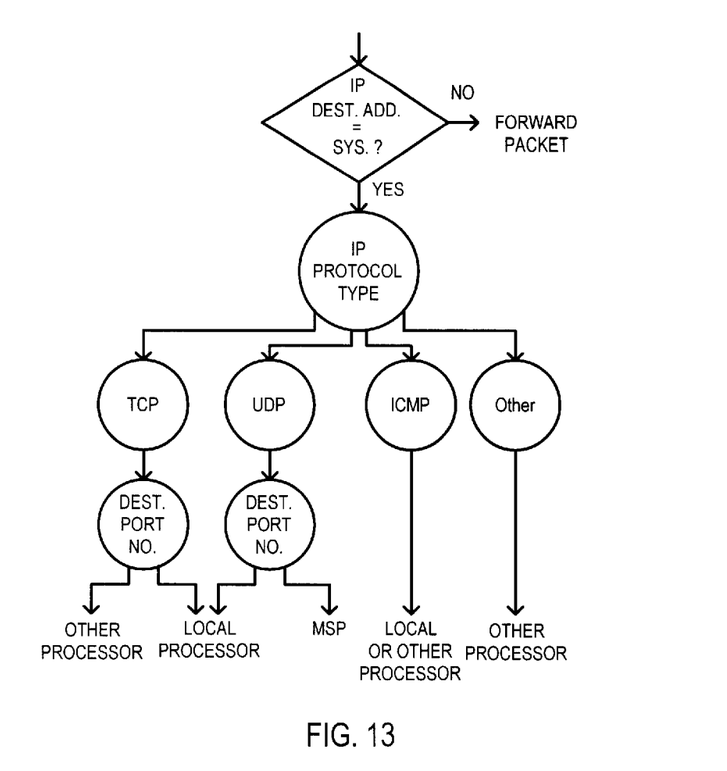
FIG. 13 is a flow diagram illustrating the filtering of voice packet data according to one embodiment.

Referring now to FIG. 13, a flow diagram is set forth illustrating how a CAM can be used to essentially "filter" incoming packets. Filtering of packets involves establishing which of a variety of systems will process the particular packet. Such a filtering operation can be accomplished by applying the appropriate header information to the CAM. In the particular CAM processing operation set forth in FIG. 13, IP destination address values are checked for match corresponding to a voice packet processing system. If no match occurs, the packet is forwarded. In the event an IP destination address match occurs, other field matches will affect the processing of the packet.

As shown by FIG. 13, when an IP destination match occurs, an IP protocol value will determine how an incoming packet is processed. How TCP and UDP packets are processed will then depend upon their respective destination port values. According to its destination port value, a TCP packet will be processed by an external processor (such as one coupled to an external bus interface 902-3/1002-3) or a local processor 902-2/1002-2, while a UDP packet will be processed by a local processor 902-2/1002-2 or a specialized processor (such as MSP1 902-0/1002-0 or MSP2 902-1/1002-1). In the arrangement of FIG. 13, an ICMP packet can be processed by an external processor or the local processor 902-2/1002-2. All other packets are processed by an external processor.

Figure 14:
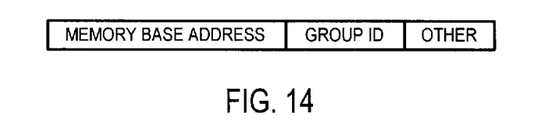
FIG. 14 is a chart indicating a channel identifying memory entry according to one embodiment.

As will be recalled, a CHANNEL# value generated by a CAM, can be used by a processor to arrive at a base address for a buffer system. Such a function can involve utilizing dedicated hardware having channel address memory. Alternatively, a processor can access a system memory (not shown), where the system memory includes particular channel information. Referring now to FIG. 14, an example of a possible channel address memory location/system memory location is set forth in a diagram. The location of FIG. 14 includes a channel memory base address (MEMORY BASE ADDRESS) as well as other information. In particular, a group identification value (GROUP ID) is included that allows voice channels to be commonly grouped. An "OTHER" value is shown which can include other voice channel information that may be required for certain other protocols or voice data formats. As just one example, the OTHER field can include feedback information necessary for protocols that require such information for particular channels. RTCP is but one example of such a protocol.

Systems have been described that include a CAM for rapidly processing voice data. The CAM can enable multiplexed voice data to be de-multiplexed rapidly "on-the-fly."

This is in contrast to other approaches that would store the entire packet, examine the packet for particular channel information according to an algorithm, and then write voice data for one channel at a time into a memory location. The utilization of the CAM also allows voice packets to be rapidly filtered from other packets.

It is noted that while certain portions of the embodiments could be formed as separate integrated circuits, it can be particularly advantages to integrate portions together. In particular, a CAM system and voice packet buffer system could be fabricated on the same integrated circuit. Further, a CAM system, voice packet buffer system, and one or more processors could provide a "one-chip" solution for voice over network devices. Such a solution can be more cost effective to produce, more compact, consume less power, and/or provide faster operating speed as signal propagation becomes faster.

It is understood that while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A system for processing voice data transmitted on a network in packet form, the system comprising:
   a content addressable memory (CAM) that includes a plurality of entries that can be compared with voice packet header information, the CAM providing a voice channel value for predetermined header information; and
   a voice packet buffer memory that includes a plurality of storage locations accessible by the application of a buffer address, the voice packet buffer memory including storage locations corresponding to particular voice channel values provided by the CAM.

2. The system of claim 1, wherein:
   the CAM includes a plurality of match fields, the match fields being maskable at a bit level.

3. The system of claim 1, wherein:
   the system can receive multiplexed voice data packets having channel identification values that indicate voice data for particular channels; and
   the CAM includes a channel identification value, match field and provides different voice channel values in response to different channel identification values in the same multiplexed voice data packet.

4. The system of claim 1, further including:
   at least one CAM address bus that provides header information to the CAM.

5. The system of claim 4, wherein:
   the CAM address bus further provides buffer addresses to the voice packet buffer memory.

6. The system of claim 1, further including:
   a plurality of address buses coupled to the CAM that provide header information to the CAM; and
   at least one request bus; and
   a CAM address multiplexer that couples a selected address bus to the CAM in response to signals on the at least one request bus.

7. The system of claim 1, further including:
   a plurality of data buses coupled to the CAM;
   at least one request bus; and
   a CAM data multiplexer that couples a selected data bus to the CAM in response to signals on the at least one request bus.

8. The system of claim 1, further including:
   a channel address memory that includes a plurality of memory locations accessed by voice channel values from the CAM, each memory location including base buffer address of a location within the voice packet buffer memory.

9. The system of claim 8, further including:
   a channel address generator that can receive an offset address value and add the offset address value to a base buffer address to generate a buffer address for the voice packet buffer memory.

10. A system coupled to a network having a plurality of voice data source locations that send voice data, the system comprising:
    a first bus that receives network packet header information;
    a content addressable memory (CAM) address system coupled to the first bus, the CAM address system including a CAM device having a plurality of entries, each entry including a number of match fields that each identify a particular voice data source location, the CAM address system generating a channel number value in response to a voice network packet, the channel number corresponding to the voice data source that sends a voice network packet; and
    a voice packet buffer memory system that includes a plurality of storage locations accessible by an applied address, the voice packet buffer memory receiving buffer address values derived from channel numbers provided by the CAM address system.

11. The system of claim 10, wherein:
    the CAM address system includes entries with a network layer field and a transport layer field that can identify a voice data source.

12. The system of claim 11, wherein:
    the CAM address system includes entries with a network layer field, a transport layer field, and a channel identification field, the network layer field and a transport layer field identifying a voice data source, the channel identification field identifying a particular voice channel from multiple voice channels sent by a voice data source.

13. The system of claim 10, wherein:
    the voice packet buffer memory system includes a buffer static random access memory (SRAM).

14. The system of claim 13, wherein:
    the voice packet buffer memory system further includes a memory interface that can be coupled to at least one expansion memory device, the buffer SRAM and memory interface receiving buffer addresses.

15. The system of claim 14, wherein:
    the memory interface is a SRAM interface.

16. The system of claim 10, wherein:
    the voice packet buffer memory system includes a plurality of contiguous storage locations, the storage locations including channel locations designated for particular voice channels, the channel locations beginning with predetermined base addresses, and being non-contiguous with one another.

17. A system for de-multiplexing multiple voice channel data transmitted in a single network packet, the system comprising:
    a plurality of information buses that can each carry network packet data;

a content addressable memory (CAM) that includes a plurality of match fields, including a channel identification field for distinguishing between different voice channels in a single network packet;

a CAM address multiplexer (MUX) coupled to the plurality of information buses the CAM address multiplexer coupling a selected information bus to the CAM according to arbitration signals;

a request bus that carries control information; and a CAM request arbiter coupled to the request bus, the CAM request arbiter generating arbitration signals for the CAM address multiplexer in response to control information.

18. The system of claim 17, wherein:

at least one of the information buses provides network packet data from a network.

19. The system of claim 17, wherein:

at least one of the information buses provides voice data from a time division multiplexed voice data line.

20. The system of claim 17, wherein:

the system can receive non-multiplexed voice data packets;

at least one of the information buses can carry non-multiplexed voice data packets; and the CAM includes match fields for distinguishing a voice channel in a non-multiplexed voice data packet, the channel identification field being masked when the CAM receives non-multiplexed voice data packet information.

* * * * *